(12) United States Patent
Kudriashov et al.

(10) Patent No.: US 11,030,753 B2
(45) Date of Patent: Jun. 8, 2021

(54) IMAGE SEGMENTATION AND MODIFICATION OF A VIDEO STREAM

(71) Applicant: Snap Inc., Santa Monica, CA (US)

(72) Inventors: Igor Kudriashov, Saratov (RU); Fedir Poliakov, Marina Del Rey, CA (US); Maksim Gusarov, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/698,463

(22) Filed: Nov. 27, 2019

(65) Prior Publication Data

US 2020/0098114 A1    Mar. 26, 2020

Related U.S. Application Data

(63) Continuation of application No. 16/232,737, filed on Dec. 26, 2018, now Pat. No. 10,515,454, which is a
(Continued)

(51) Int. Cl.
*G06K 9/00*      (2006.01)
*G06T 7/20*      (2017.01)
(Continued)

(52) U.S. Cl.
CPC ............ *G06T 7/20* (2013.01); *G06K 9/00248* (2013.01); *G06K 9/00281* (2013.01);
(Continued)

(58) Field of Classification Search
CPC .......... G01R 33/56; G06T 2207/20172; G06T 2207/20212; G06T 2207/20216; G06T 2207/20221; G06T 2207/20224; G06T 5/00; G06T 5/001; G06T 5/006; G06T 5/10; G06T 5/20; G06T 5/40; G06T 5/50;
(Continued)

(56) References Cited

U.S. PATENT DOCUMENTS 5,802,220 A *   9/1998   Black ................. G06K 9/00248
                                                          382/100
6,028,960 A *   2/2000   Graf .................... G06K 9/00268
                                                          382/100
(Continued)

FOREIGN PATENT DOCUMENTS

CA           2887596 A1    7/2015
CN          108604378 A    9/2018
(Continued)

OTHER PUBLICATIONS

"U.S. Appl. No. 14/953,726, Corrected Notice of Allowability dated Oct. 3, 2018", 6 pgs.
(Continued)

*Primary Examiner* — Avinash Yentrapati
(74) *Attorney, Agent, or Firm* — Schwegman Lundberg & Woessner, P.A.

(57) ABSTRACT

Systems, devices, media, and methods are presented for segmenting an image of a video stream with a client device, identifying an area of interest, generating a modified area of interest within one or more image, identifying a first set of pixels and a second set of pixels, and modifying a color value for the first set of pixels.

20 Claims, 11 Drawing Sheets

Related U.S. Application Data continuation of application No. 14/953,726, filed on Nov. 30, 2015, now Pat. No. 10,198,819.

(51) Int. Cl.
- *G06K 9/46* (2006.01)
- *G06T 11/00* (2006.01)
- *G06T 3/40* (2006.01)
- *G06T 5/00* (2006.01)
- *G06T 7/11* (2017.01)
- *G06T 7/136* (2017.01)
- *G06T 7/73* (2017.01)
- *G06T 7/90* (2017.01)

(52) U.S. Cl.
CPC ......... *G06K 9/4642* (2013.01); *G06K 9/4652* (2013.01); *G06T 3/40* (2013.01); *G06T 5/008* (2013.01); *G06T 7/11* (2017.01); *G06T 7/136* (2017.01); *G06T 7/73* (2017.01); *G06T 7/90* (2017.01); *G06T 11/001* (2013.01); *G06K 2009/4666* (2013.01); *G06T 2207/10016* (2013.01); *G06T 2207/30201* (2013.01)

(58) Field of Classification Search
CPC ........... G06T 2207/20201; G06T 5/003; G06T 5/004; G06T 7/0091; G06T 2207/20036; G06T 5/30; G06T 2207/20192; G06T 7/0083; G06T 7/403; G06T 2207/20024; G06T 2207/20028; G06T 5/002; G06T 5/005; H04N 5/23212; H04N 5/23254; H04N 5/23264; H04N 5/23267; H04N 5/23277; H04N 1/409; H04N 1/4092; G06K 9/44; G06K 9/40; G06F 17/16; H03H 17/0202; H03H 17/0223

See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,218,750 B1* | 5/2007 | Hiraishi | G06K 9/46 |
| | | | 382/100 |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,437,556 B1* | 5/2013 | Saisan | G06K 9/6247 |
| | | | 382/224 |
| 8,559,712 B2* | 10/2013 | Dalton | G06K 9/00248 |
| | | | 382/167 |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 10,198,819 B2 | 2/2019 | Kudriashov et al. | |
| 10,515,454 B2 | 12/2019 | Kudriashov et al. | |
| 2004/0165768 A1* | 8/2004 | Zhang | H04L 29/06027 |
| | | | 382/162 |
| 2005/0163393 A1* | 7/2005 | Asari | G06T 5/009 |
| | | | 382/254 |
| 2005/0249429 A1 | 11/2005 | Kitamura | |
| 2007/0189627 A1* | 8/2007 | Cohen | G06K 9/00228 |
| | | | 382/254 |
| 2007/0201725 A1* | 8/2007 | Steinberg | G06K 9/00308 |
| | | | 382/103 |
| 2007/0242066 A1* | 10/2007 | Levy Rosenthal | H04N 7/15 |
| | | | 345/419 |
| 2010/0220891 A1* | 9/2010 | Lefevre | G06T 7/20 |
| | | | 382/103 |
| 2010/0284616 A1 | 11/2010 | Dalton et al. | |
| 2011/0202598 A1 | 8/2011 | Evans et al. | |
| 2012/0063648 A1* | 3/2012 | Dalton | G06K 9/00248 |
| | | | 382/118 |
| 2012/0148103 A1* | 6/2012 | Hampel | G06K 9/00771 |
| | | | 382/103 |
| 2012/0209924 A1 | 8/2012 | Evans et al. | |
| 2013/0169827 A1* | 7/2013 | Santos | H04N 5/23229 |
| | | | 348/207.1 |
| 2013/0195316 A1* | 8/2013 | Bataller | G06K 9/6255 |
| | | | 382/103 |
| 2013/0257892 A1* | 10/2013 | Ozawa | G06K 9/38 |
| | | | 345/589 |
| 2014/0176548 A1* | 6/2014 | Green | G06T 7/251 |
| | | | 345/426 |
| 2014/0201126 A1* | 7/2014 | Zadeh | A61B 5/165 |
| | | | 706/52 |
| 2015/0131851 A1* | 5/2015 | Bernal | G06T 7/194 |
| | | | 382/103 |
| 2015/0248775 A1* | 9/2015 | Freeman | G06T 7/174 |
| | | | 345/589 |
| 2015/0278616 A1* | 10/2015 | Li | G06T 7/194 |
| | | | 382/103 |
| 2015/0310273 A1* | 10/2015 | Shreve | G06T 5/005 |
| | | | 382/103 |
| 2017/0262994 A1 | 9/2017 | Kudriashov et al. | |
| 2018/0005340 A1* | 1/2018 | Otake | H04N 1/4072 |
| 2019/0206061 A1 | 7/2019 | Kudriashov et al. | |

FOREIGN PATENT DOCUMENTS

| | | |
|---|---|---|
| JP | 2007208413 A | 8/2007 |
| KR | 20080107012 A | 12/2008 |
| WO | WO-2015120293 A1 | 8/2015 |
| WO | WO-2017095807 A1 | 6/2017 |

OTHER PUBLICATIONS

"U.S. Appl. No. 14/953,726, Final Office Action dated Aug. 24, 2017", 10 pgs.

"U.S. Appl. No. 14/953,726, Non Final Office Action dated Mar. 10, 2017", 8 pgs.

"U.S. Appl. No. 14/953,726, Non Final Office Action dated Mar. 26, 2018", 10 pgs.

"U.S. Appl. No. 14/953,726, Notice of Allowance dated Sep. 21, 2018", 9 pgs.

"U.S. Appl. No. 14/953,726, Response filed Feb. 23, 2018 to Final Office Action dated Aug. 24, 2017", 11 pgs.

"U.S. Appl. No. 14/953,726, Response filed Jul. 10, 2017 to Non Final Office Action dated Mar. 10, 2017", 13 pgs.

"U.S. Appl. No. 14/953,726, Response filed Jul. 25, 2018 to Non Final Office Action dated Mar. 26, 2018", 11 pgs.

"U.S. Appl. No. 16/232,737, Examiner Interview Summary dated Jul. 1, 2019", 3 pgs.

"U.S. Appl. No. 16/232,737, Non Final Office Action dated Apr. 4, 2019", 8 pgs.

"U.S. Appl. No. 16/232,737, Notice of Allowance dated Aug. 22, 2019", 7 pgs.

"U.S. Appl. No. 16/232,737, Preliminary Amendment filed Mar. 25, 2019", 9 pgs.

"U.S. Appl. No. 16/232,737, Response filed Jul. 2, 2019 to Non Final Office Action dated Apr. 4, 2019", 11 pgs.

"International Application Serial No. PCT/US2016/063997, International Preliminary Report on Patentability dated Jun. 14, 2018", 10 pgs.

(56) References Cited

OTHER PUBLICATIONS

"International Application Serial No. PCT/US2016/063997, International Search Report dated Mar. 2, 2017", 4 pgs.

"International Application Serial No. PCT/US2016/063997, Written Opinion dated Mar. 2, 2017", 8 pgs.

"Korean Application Serial No. 10-2018-7018268, Notice of Preliminary Rejection dated Jan. 10, 2020", w/ English Translation, 12 pgs.

Grundland, Mark, et al., "Decolorize: Fast, contrast enhancing, color to grayscale conversion", Pattern Recognition 40, (2007), 2891-2896.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Smith, Kaleigh, et al., "Apparent Greyscale: A Simple and Fast Conversion to Perceptually Accurate Images and Video", Europgraphics, 27(2), (2008), 193-200.

U.S. Appl. No. 14/953,726 U.S. Pat. No. 10,198,819, filed Nov. 30, 2015, Image Segmentation and Modification of a Video Stream.

U.S. Appl. No. 16/232,737 U.S. Pat. No. 10,515,454, filed Dec. 26, 2018, Image Segmentation and Modification of a Video Stream.

"Korean Application Serial No. 10-2018-7018268, Response filed Apr. 8, 2020 to Notice of Preliminary Rejection dated Jan. 10, 2020", w/ English Claims, 23 pgs.

\* cited by examiner

IMAGE SEGMENTATION AND MODIFICATION OF A VIDEO STREAM

PRIORITY

This application is a continuation of U.S. patent application Ser. No. 16/232,737, filed Dec. 26, 2018, which is a continuation of U.S. patent application Ser. No. 14/953,726, filed Nov. 30, 2015, which applications are incorporated herein by reference in their entireties.

TECHNICAL FIELD

Embodiments of the present disclosure relate generally to automated image segmentation of a video stream. More particularly, but not by way of limitation, the present disclosure addresses systems and methods for image segmentation of identified areas of interest within a face depicted in a video stream.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

BRIEF DESCRIPTION OF THE DRAWINGS

Various ones of the appended drawings merely illustrate example embodiments of the present disclosure and should not be considered as limiting its scope.

Figure 1:
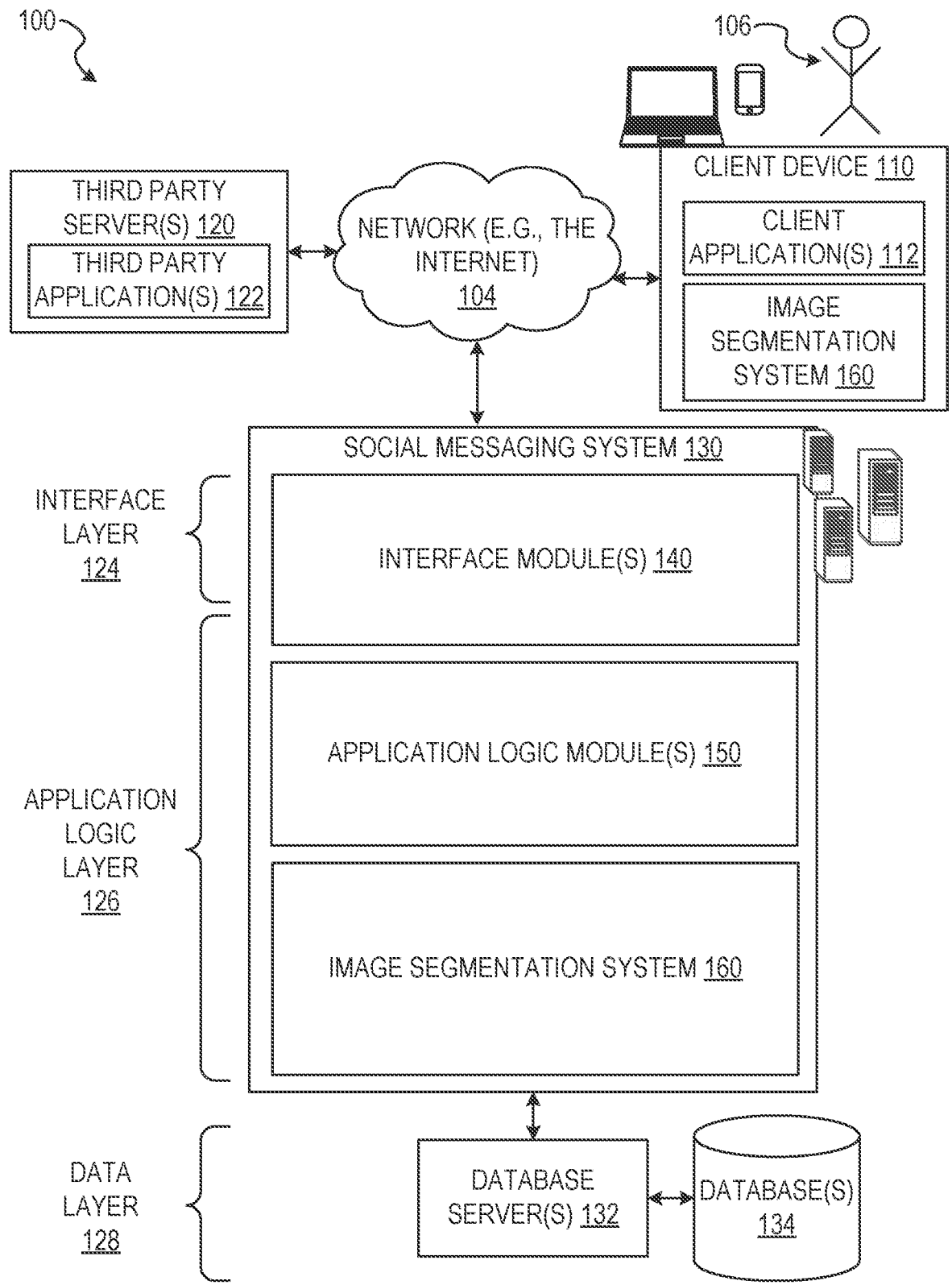
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although telecommunications applications and devices exist to provide two way video communication between two devices, there can be issues with video streaming, such as modifying images within the video stream during a communication session. Methods generally accepted for editing or modifying video do modify video or video communications as the video is being captured or the video communication is conducted. Accordingly, there is still a need in the art to improve video communications between devices.

Embodiments of the present disclosure relate generally to automated image segmentation of a video stream. Some embodiments relate to image segmentation of identified areas of interest within a face depicted in a video stream. For example, in one embodiment, an application operating on a device receives video captured by the device. The video captured by the device is a video stream such as a video conference or video chat between mobile devices. The application identifies a mouth within the video stream and exposed teeth within the mouth. The application tracks the exposed teeth across the video stream. While receiving the video stream from a camera of the device and transmitting the video stream to another mobile device, the application modifies the exposed teeth in the video stream, when the teeth are visible in the video stream. The application modifies the teeth by whitening the teeth. The mobile device receiving the video conference streaming from the mobile device running the application displays the teeth of the person on the video chat as whitened. The application can also change the color of the teeth to any desired color, rotate between colors, and display multiple colors.

The above is one specific example. The various embodiments of the present disclosure relate to devices and instructions by one or more processors of a device to modify a video stream transmitted by the device to another device while the video stream is being captured (e.g., modifying a video stream in real time). An image segmentation system is described that identifies and tracks objects of interest across a video stream and through a set of images comprising the video stream. In various example embodiments, the image segmentation system identifies and tracks one or more facial features depicted in a video stream. Although described with respect to facial features, it should be understood that the image segmentation system may track any object of interest, as discussed below.

The image segmentation system receives the video stream from an imaging device and identifies an approximate location of an object of interest within images of the video stream. An area of interest is identified around the object of interest. In some embodiments, images containing the object of interest are cropped in a portion of the video stream to remove image data outside the area of interest. The image segmentation system may perform one or more images processing operations on the area of interest to increase contrast and manipulate pixel values to identify the object of interest within the area of interest and isolate the object of interest from other objects, shapes, textures, or other features of the area of interest. Once specific pixels are identified for the object of interest, the image segmentation system may track the pixels of the object of interest across other portions of the video stream. In some embodiments, the image segmentation system modifies values of the object of interest within the video stream by identifying the relative location of the pixels of the object of interest in reference to other points within the image and tracking pixels which correspond to the location of the object of interest. The image segmentation system may modify the appearance of the object of interest within the video stream by modifying color values for pixels representing the object of interest. In some instances, the image segmentation system generates an image layer, overlaying the image layer on images within the video stream in order to modify the appearance of the object of interest.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions, forming a hardware-implemented module or engine and acting, at the time of the execution of instructions, as a special purpose machine configured to carry out a particular set of functions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receives requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an image segmentation system 160 such that modules of the image segmentation system 160 configure the client device 110 to perform a specific set of functions with respect to operations of the image segmentation system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the image segmentation system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts)

on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 may include at least a portion of the image segmentation system 160 capable of identifying, tracking, and modifying video data during capture of the video data by the client device 110. Similarly, the client device 110 includes a portion of the image segmentation system 160, as described above. In other examples, client device 110 may include the entirety of image segmentation system 160. In instances where the client device 110 includes a portion of (or all of) the image segmentation system 160, the client device 110 can work alone or in cooperation with the social messaging system 130 to provide the functionality of the image segmentation system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various modules described herein within the context of any of generating, sending, receiving, or displaying aspects of an ephemeral message. For example, a device implementing the image segmentation system 160 may identify, track, and modify an object of interest, such as a set of exposed teeth within a mouth depicted in the video clip. The device may modify the object of interest during capture of the video clip without image processing after capture of the video clip as a part of a generation of content for an ephemeral message.

Figure 2:
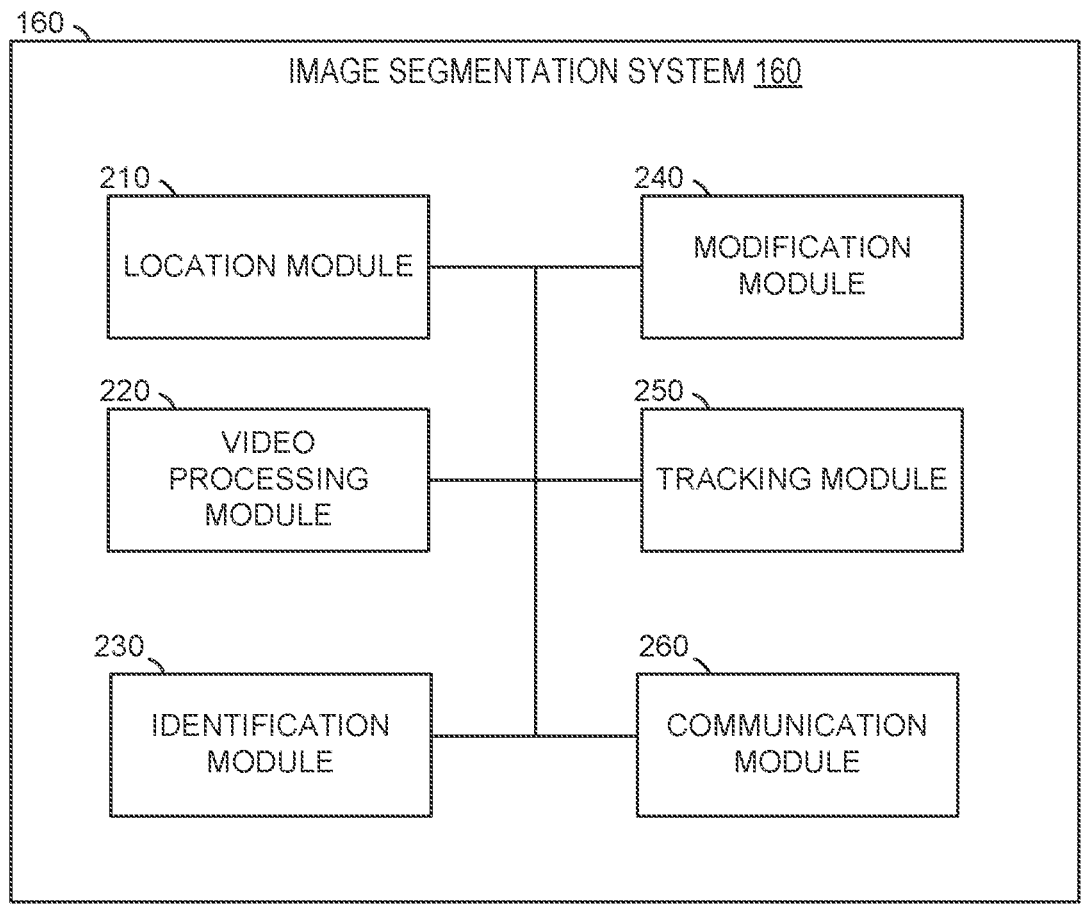
FIG. 2 is a diagram illustrating an image segmentation system, according to some example embodiments.

In FIG. 2, in various embodiments, the image segmentation system 160 can be implemented as a standalone system or implemented in conjunction with the client device 110, and is not necessarily included in the social messaging system 130. The image segmentation system 160 is shown to include a location module 210, a video processing module 220, an identification module 230, a modification module 240, a tracking module 250, and a communication module 260. All, or some, of the modules 210-260, communicate with each other, for example, via a network coupling, shared memory, and the like. Each module of modules 210-260 can be implemented as a single module, combined into other modules, or further subdivided into multiple modules. Other modules not pertinent to example embodiments can also be included, but are not shown.

The location module 210 performs locating operations within the image segmentation system 160. In various example embodiments, the location module 210 identifies and provides locations for an object of interest depicted by images of a video stream (e.g., one or more frames of a video stream). In some embodiments, the location module 210 may be a portion of a face tracking module or system. In some instances, where an object of interest is a portion of a face, the location module 210 identifies a location of a face depicted in one or more images of within a video stream and one or more facial features depicted on the face. For example, where the location module 210 is configured to locate exposed teeth within a mouth, the location module 210 may identify a face depicted within an image, identify a mouth on the face, and identify exposed teeth within a portion of the images of the video stream which include the mouth.

In at least some embodiments, the location module 210 locates an area of interest within the one or more image which contains the object of interest. For example, the area of interest identified by the location module 210 may be a portion of images within the video stream, such as a rectangle in which the object of interest appears. Although referenced as a rectangle, the area of interest may be any suitable shape or combination of shapes, as described below. For example, the area of interest may be represented as a circular shape, a polygonal shape, or an outline shaped and sized similarly to and including the object of interest (e.g., an outline of a mouth, a wall, a vehicle).

In some embodiments, the location module 210 performs cropping functions. For example, after determining an area of interest within an image, the location module 210 crops the image, removing from consideration areas outside of the area of interest. In some instances, after cropping, the area of interest is processed by one or more other modules of the image segmentation system 160. Where processed by other modules, the location module 210, alone or with cooperation of the communication module 260 transfers the cropped area of interest to one or more other modules (e.g., the video processing module 220).

The video processing module 220 performs one or more video processing functions for one or more of the area of interest identified by the location module 210 on one or more images within the video stream. In various embodiments, the video processing module 220 converts the area of interest of one or more images of the video stream to a binary area of interest, where each pixel has one of two values. As described below, the binary image produced by the video processing module 220 contains two possible values, zero or one, for any pixel within the binarized area of image. The video processing module 220 may convert the area of interest or the one or more images of the video to represent the depicted object of interest as a contrasting color image. For example, the pixels in the binarized image may be converted to representing only black (e.g., a value of one) and white (e.g., a value of zero). Although described in the present disclosure as a contrasting image composed of black and white pixels, the video processing module 220 may convert the area of interest of the one or more images of the video stream to any two contrasting colors (e.g., red vs. blue). Once binarized, the video processing module 220 may transmit or otherwise pass the binarized area of interest to one or more additional modules of the image segmentation system 160. For example, the video processing module 220, alone or in cooperation with the communication module 260, may pass the binarized area of interest to the identification module 230.

In some embodiments, the video processing module 220 processes the area of interest to increase contrast between a first set of pixels and a second set of pixels without binarizing the area of interest or generating the binarized area of interest through an iterative process in order to increase contrast between the first set of pixels and the second set of pixels while maintaining the shape, size, and pixel area of the object of interest represented by the first set of pixels or the second set of pixels.

The identification module 230 identifies a first set of pixels and a second set of pixels within an area of interest modified by the video processing module 220. The identification module 230 may identify the sets of pixels based on differing color values between the first set of pixels and the second set of pixels or based on a combination of differences in color values of the first set of pixels, the second set of pixels, and a threshold value.

In some embodiments, the identification module 230 marks the first set of pixels within a set of images of the video stream, generating a set of marked pixels. In some instances, the identification module 230 also identifies location for the first set of pixels with respect to a set of reference landmarks within images of the video stream or the area of interest. The identification module 230 identifies color values for the first set of pixels within one or more of a first set of images and a second set of images within the video stream. Where the first set of pixels have been marked, the identification module 230 may cooperate with the tracking module 250 to identify pixels of the second set of images of the video stream which correspond to the marked pixels and identifies color values for the corresponding pixels.

The modification module 240 may perform one or more modifications on the object of interest or the portion of the object of interest within the second set of images of the video stream, based on the tracking of the tracking module 250. For example, the tracking module 250 may identify locations of portions of the object of interest within the second set of images of the video stream and pass the locations to the modification module 240. In turn, the modification module 240 may perform the one or more modifications to the portions of the object of interest to generate a modified second set of images of the video stream. The modification module 240 may then pass the modified second set of images of the video stream to the communication module 260 for transmission to another client device, the social messaging system 130, or a storage device of the client device 110 while the video stream is being captured. In some embodiments, the modification module 240 may perform the modifications in real time for transmission of the modified second set of images of the video stream in a full duplex communication among two or more client devices. For example, where the tracking module 250 tracks the marked pixels or landmarks identified by the identification module 230, the modification module 240 may modify the color of the object of interest (e.g., whiten exposed teeth within a mouth) within the second set of images of the video stream (e.g., a video conference) to generate the modified second set of images of the video stream. The modification module 240, in cooperation with the communication module 260, may transmit the modified second set of images of the video stream from the client device 110 to one or more other client device.

The tracking module 250 tracks at least one of the object of interest and the portion of the object of interest based in part on the data generated by the identification module 230 (e.g., the identified pixels, marked pixels, landmark referenced pixels). In some embodiments, the tracking module 250 identifies and tracks corresponding pixels within one or more images of the second set of images of the video stream. The corresponding pixels represent the first set of pixels (e.g., the object of interest) within the second set of images of the video stream. In some instances, the tracking module 250 tracks the marked pixels (e.g., the corresponding pixels) based on identified landmarks or as a set of landmarks. For example, the marked pixels may be included in a binary mask as additional landmark points for tracking with positions identified with respect to other landmarks of the binary mask. The tracking module 250 may also track obstructions of the object of interest to cause the modification module 240 to modify or refrain from modifying pixels based on whether the object of interest is displayed within an image of the second set of images of the video stream.

The communication module 260 provides various communications functionality. For example, the communication module 260 receives communication data indicative of data received from an input of the client device 110. The communication data can be indicative of a modified video stream created by a user on the client device 110 for storage or for transmission to a client device of another user. The communication module 260 can cause transmission of the communication data between client devices, via a communications network. The communication module 260 can exchange network communications with the database servers 132, the client devices 110, and the third party servers 120. The information retrieved by the communication module 260 includes data associated with the user (e.g., member profile data from an online account or social network service data) or other data to facilitate the functionality described herein. In some embodiments, the communication module 260 causes communication between one or more of the location module 210, the video processing module 220, the identification module 230, the modification module 240, and the tracking module 250.

Figure 3:
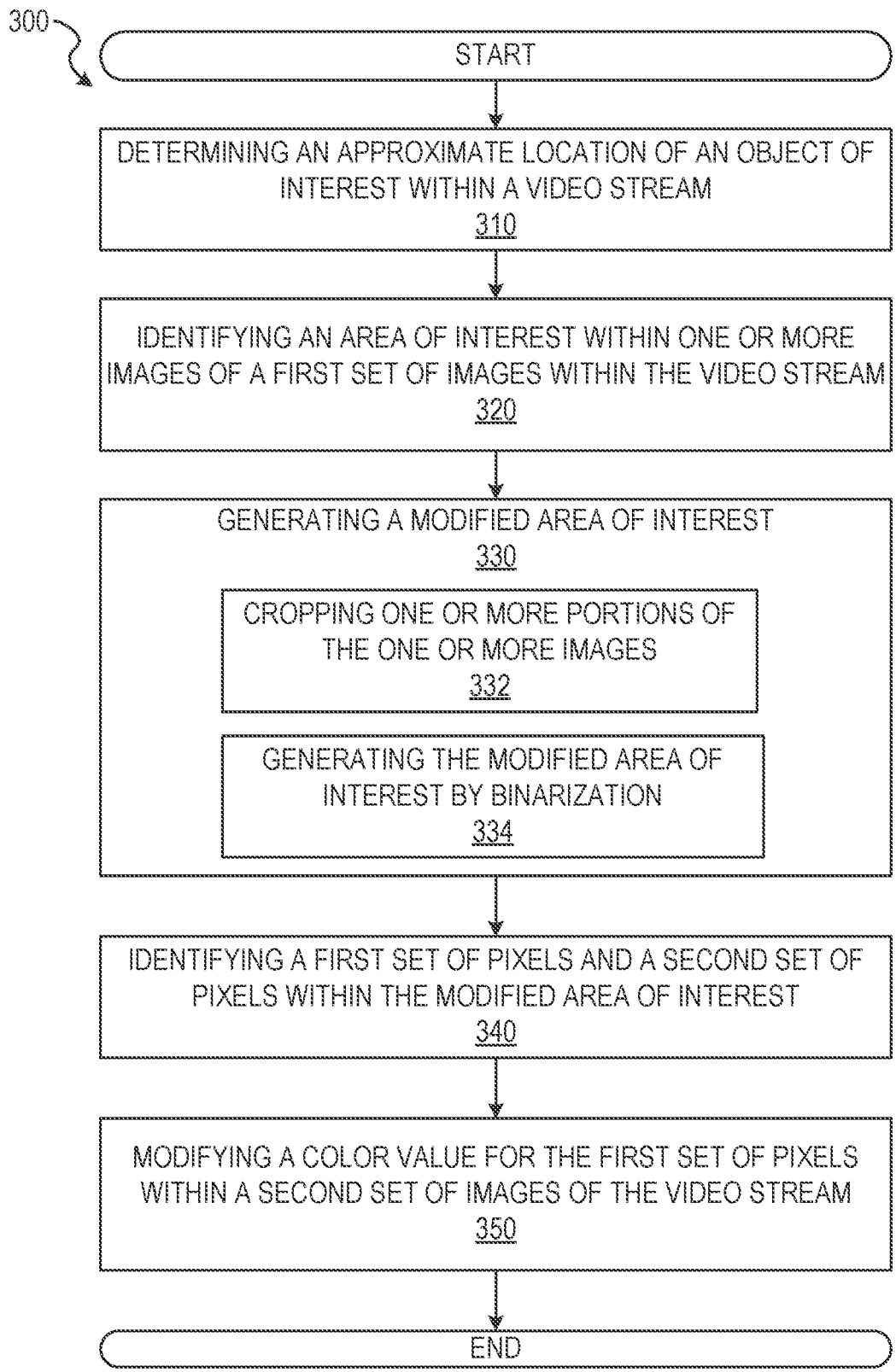
FIG. 3 is a flow diagram illustrating an example method for segmenting images within a video stream and modifying portions of the video stream based on the segmentation, according to some example embodiments.

FIG. 3 depicts a flow diagram illustrating an example method 300 for segmenting portions of a video stream and modifying portions of the video stream based on the segmentation. The operations of method 300 may be performed by components of the image segmentation system 160, and are so described below for purposes of illustration.

In operation 310, the location module 210 determines an approximate location of an object of interest within a video stream. The video stream comprises a set of images. In some embodiments, the set of images of the video stream is divided into a first set of images and a second set of images. In these instances, the first set of images represents a portion of the video stream in which the image segmentation system 160 processes one or more images and identifies the object of interest and a relationship between the object of interest and one or more reference objects within the video stream. The second set of images represents a portion of the video stream in which the image segmentation system 160 tracks the object of interest. The image segmentation system 160 may modify one or more aspect of the tracked object of interest within the second set of images.

In various example embodiments, the location module 210 is configured to identify and locate a predetermined object or type of objects. For example, the location module 210 may be configured to identify and locate a wall, a vehicle, a facial feature, or any other object appearing in the video stream. In some instances, the location module 210 is configured to identify an object chosen from a plurality of object types. Where the object is chosen from a plurality of object types, the image segmentation system 160 may receive user input selecting an object from a list, table, or other organized set of objects. The object may also be chosen automatically by the image segmentation system 160.

Where the image segmentation system 160 chooses the object from the plurality of object types, the image segmentation system 160 identifies one or more objects within the video stream as members of the plurality of objects. The image segmentation system 160 may determine the object of interest from the one or more objects based on position, prominence, size, or any other suitable. In some instances, the image segmentation system 160 identifies the object of interest from the one or more objects by selecting an object of the one or more objects which is positioned proximate to a center of the image. In some embodiments, the image segmentation system 160 identifies the object of interest based on a position of the object in a plurality of images of the first set of images. For example, where an object is positioned prominently (e.g., proximate to a center of the image) and is detected in a percentage or a number of images of the first set of images (e.g., where the percentage or number exceeds a predetermined threshold), the image segmentation system 160 selects the object.

Figure 4:
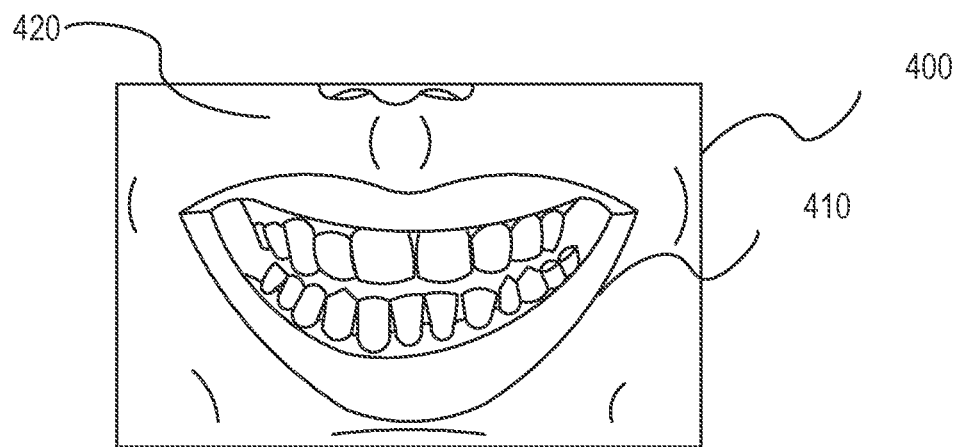
FIG. 4 illustrates an area of interest within one or more images of a video stream, according to some example embodiments.

In some embodiments, the location module 210 determines an approximate location of a mouth 410 within the video stream (e.g., within the first set of images of the video stream), as shown in FIG. 4. Where the location module 210 determines the mouth, the location module 210 may employ a set of face tracking operations to determine one or more landmarks in a face depicted within an image, or a set of images, and identify landmarks which represent the mouth.

In operation 320, the location module 210 identifies an area of interest within the one or more images of the first set of images. The area of interest is a portion of the one or more images encompassing the approximate location of the object of interest. In some instances, where the object of interest is a mouth, the area of interest is a portion of the image, or set of images, extending across a portion of a width of the face, to include the mouth (e.g., a width of the mouth extending between a commissure at each corner of the mouth) and a portion of the face around the mouth. The area of interest may also extend across a portion of a height of the face to include the mouth (e.g., a height of the mouth extending between the upper most vermilion border of the top lip and the lower most vermilion border of the bottom lip) and a portion of the face around the mouth.

In some embodiments, where the object of interest is a mouth, the area of interest may be a bounded area, or represented by a bounded area 400, encompassing the mouth 410 and a portion of the face 420, as shown in FIG. 4. The bounded area may be in the shape of a rectangle, a circle, an ellipse, or any other suitable bounding area. Where the mouth, being the object of interest, is identified using facial landmarks via one or more facial tracking operations, the area of interest may be a portion of an image, or set of images, which includes a predetermined portion of the image or extends a predetermined distance from any landmark identified for the mouth. For example, the area of interest may occupy five, fifteen, or twenty percent of the area of the image, or set of images. By way of further example, the area of interest may extend in any given direction between ten and one hundred pixels. Although embodiments of this disclosure present measurements and percentages of images, it should be understood that the measurements and percentages may be higher or lower based on one or more of aspects of the image (e.g., resolution, size, pixel count) and one or more aspects of a display device depicting the image (e.g., display size, display aspect ratio, resolution). For example the area of interest may be any size, from one pixel to the entirety of the area of an image of the first set of images of the video stream.

In various instances, the area of interest may be a single area of interest or a plurality of areas of interest. For example, where the location module 210 is identifying the area of interest for a pair of walls on opposite sides of a room, the location module 210 identifies a first area of interest for a first wall on a first side of the room and a second area of interest for a second wall on a second side of the room.

In operation 330, the video processing module 220 generates a modified area of interest. The video processing module 220 generates the modified area of interest by performing one or more image processing functions on the area of interest. In some embodiments, the operation 330 comprises a set of sub-operations in generating the modified area of interest.

In operation 332, the video processing module 220 crops one or more portions of the one or more images of the first set of images outside of the area of interest. For example, the area of interest can be cropped to the bounded area 400 of the area of interest depicted in FIG. 4. In some embodiments, in cropping the one or more images, the video processing module 220 isolates the area of interest by removing portions of the one or more images which occur outside of the area of interest. For example, where the area of interest is positioned proximate to the center of the area of interest and comprises fifteen percent of an image of the one or more images, the video processing module 220 removes the eighty-five percent of the image which is not bounded within the area of interest.

Figure 5:
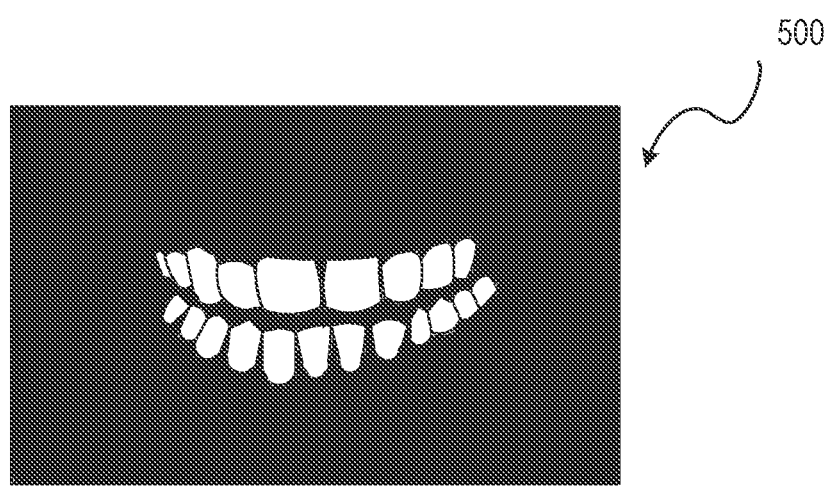
FIG. 5 illustrates a binarized image of an area of interest, according to some example embodiments.

In various example embodiments, after cropping the one or more images to remove image data outside the bounded area of the area of interest, the video processing module 220 performs one or more operations to generate the modified area of interest to enable the identification module 230 to discern the object of interest within the modified area of interest from unrelated shapes, features, textures, and other aspects of the image, or set of images, which are also located within the area of interest. In some instances, in operation 334, the video processing module 220 generates the modified area of interest by binarization. In these embodiments, the video processing module 220 generates a binary image version of the area of interest 500, as shown in FIG. 5. The video processing module 220 may use any suitable binarization method to generate the binary version of the area of interest. After the binarization process, the modified area of interest may depict the object of interest as a set of first pixels and other features of the area of interest as a second set of pixels. Other operations for generating the modified area of interest are described below with respect to FIG. 6.

In operation 340, the identification module 230 identifies a first set of pixels and a second set of pixels within the modified area of interest. In various embodiments, the identification module 230 identifies the first set of pixels as differentiating from the second set of pixels based on a comparison of values assigned to the first set of pixels and the second set of pixels. The identification module 230 may identify the first set of pixels as having a first value and the second set of pixels as having a second value. Where the modified area of interest is binarized, containing pixel color values of either one or zero, the identification module 230 identifies the first set of pixels as pixels having a color value of one (e.g., the first value) and the second set of pixels as pixels having a color value of zero (e.g., the second value).

Where the modified area of interest contains a plurality of values for pixels, such as a grayscale, the identification module 230 performs a value comparison for the pixels based on a predetermined threshold. In these instances, the identification module 230 identifies pixels as being included in the first set of pixels where the pixel's value is above the predetermined threshold. Pixels included in the second set of pixels are identified as having a value below the predetermined threshold. For example, where grayscale (e.g., intensity) values for a pixel in the modified area of interest ranges from zero to two-hundred fifty-six, the identification module 230 may identify the pixels having a value above fifty percent of the range as being included in the first set of pixels. In some instances, the identification module 230 identifies pixels as being in the first set of pixels where the pixel value is within the upper twenty percent of the grayscale (e.g., two-hundred four, or above). Although specific values have been provided with respect to grayscale intensity values, it should be understood that the values may be modified based on a plurality of factors with respect to the image and the display device depicting the image.

In operation 350, the modification module 240 modifies a color value for the first set of pixels within the second set of images of the video stream. In various embodiments, the color value of the first set of pixels is a first color value within the second set of images. In these instances, the modification module 240 identifies the first color value of the first set of pixels within the image data comprising the one or more images of the second set of images. In response to identifying the first color value for the first set of pixels, the modification module 240 replaces the first color value with a second color value distinct from the first color value. Once the modification module 240 substitutes the second color value for the first color value in the one or more images, the object of interest appears as the color for the second color value when the second set of images within the video stream are displayed.

In some instances the modification module 240 modifies the color value for the first set of pixels within the second set of images by generating a modified image layer for the first set of pixels. In these embodiments, the modified image layer is generated with the first pixels having the modified color value. The modification module 240 applies the modified image layer to at least a portion of the second set of images (e.g., one or more images of the second set of images or a portion of an image of the second set of images). The modification module 240 may cooperate with the tracking module 250 to align the location of the first set of pixels within the second set of images with the modified image layer.

Figure 6:
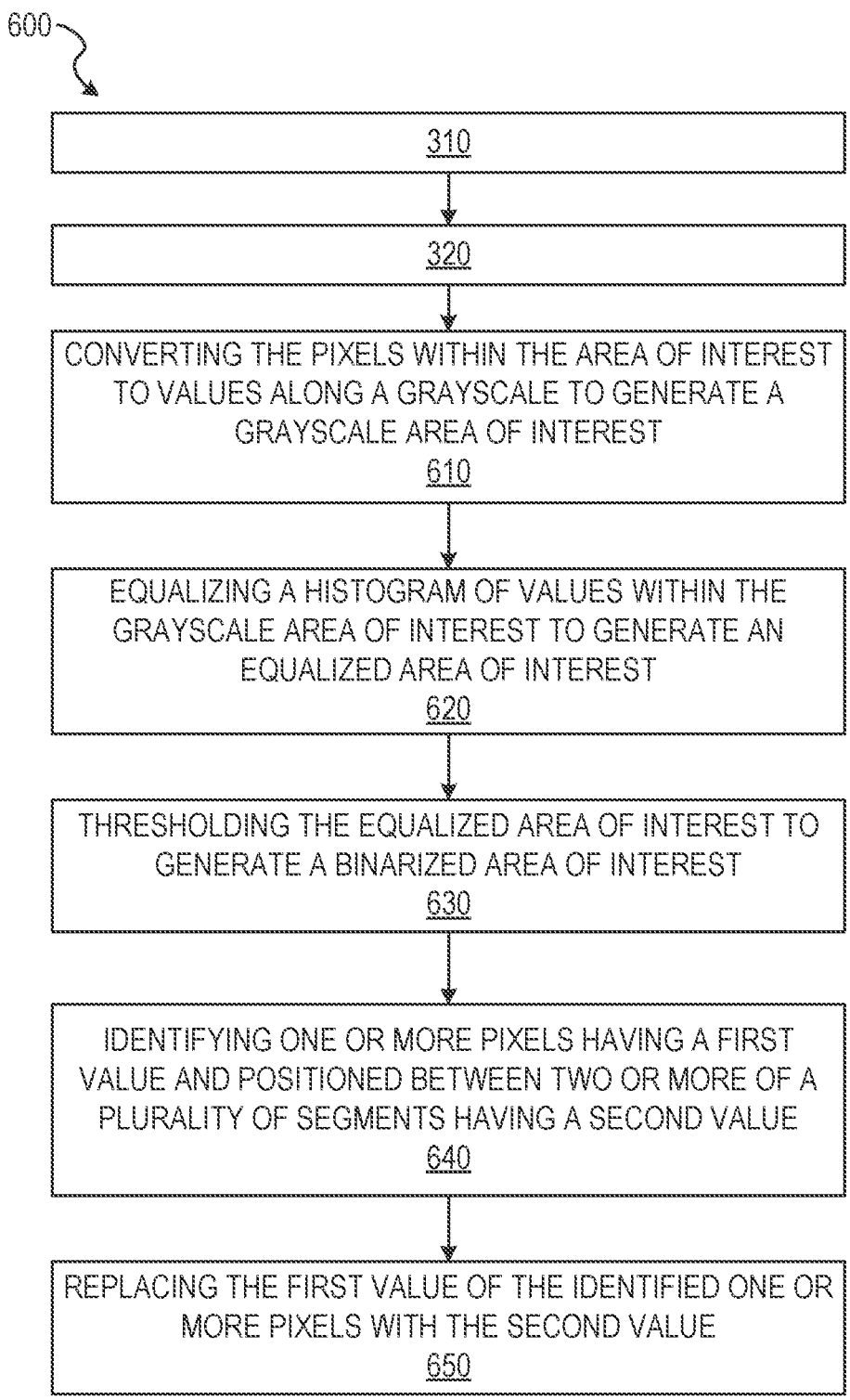
FIG. 6 is a flow diagram illustrating an example method for segmenting images within a video stream and modifying portions of the video stream based on the segmentation, according to some example embodiments.

FIG. 6 shows a flow diagram illustrating an example method 600 for segmenting portions of a video stream and modifying one or more segmented portions of the video stream. The operations of method 600 may be performed by components of the image segmentation system 160. In some instances, certain operations of the method 600 may be performed using one or more operations of the method 300 or as sub-operations of one or more operations of the method 300, as will be explained in more detail below.

In various example embodiments, the method 600 is initially performed by the image segmentation system 160 performing operation 310 and 320, as described above with respect to FIG. 3. In these embodiments, the image segmentation module determines the approximate location of an object of interest and identifies an area of interest within the one or more images of the first set of images of the video stream.

In operation 610, the video processing module 220 converts the pixels within the area of interest to values along a grayscale to generate a grayscale area of interest. The grayscale area of interest is the result of a grayscale conversion, removing color information from the pixels. The remaining value for any given pixel is an intensity value, where a weak intensity is displayed as darker than a comparative higher intensity, which is displayed as lighter. The range of intensity values displayed within the grayscale area of interest may vary based on the factors associated with the one or more images. In some instances, the intensity values may range from zero (e.g., represented as black) to 65,536 (e.g., represented as white). The intensity range may be limited to less than or extend past 65,536. For example in some instances the intensity range extends from zero to 256. Although discussed with reference to conversion to a grayscale, in some embodiments, pixels within the area of interest may be converted into a single channel other than grayscale. In some instances, the video processing module 220 identifies the intensity values, representing the grayscale, without converting the area of interest to a grayscale area of interest.

In some example embodiments, the video processing module 220 converts color values of the pixels to a grayscale value using equation 1:

$$\frac{g}{r+b} * 255 = v$$

As shown above in equation 1, "g" is a green color value for the pixel, "r" is a red color value for the pixel, "b" is a blue color value for the pixel, and "v" is the resulting grayscale value. In embodiments using equation 1, each pixel within the area of interest has a set of color values. The set of color values may be expressed as a triplet. Each value within the set of color values may represent a saturation value for a specified color. In these embodiments, the video processing module 220 performs equation 1 on each pixel within the area of interest to generate a grayscale value for each pixel and in turn, modify the area of interest into the grayscale area of interest.

In various embodiments, video processing module 220 identifies pixels of the grayscale area of interest and generates a histogram of values within the grayscale. The histogram of values may indicate a distribution of the intensity values associated with the pixels of the grayscale area of interest.

In operation 620, the video processing module 220 equalizes the histogram values within the grayscale area of interest to generate an equalized area of interest. Equalization of the histogram values results in an increase in contrast of the grayscale area of interest. For example, where the area of interest includes a mouth and exposed teeth as the object of interest, the histogram equalization causes pixels representing the teeth to lighten (e.g., increase the grayscale value) and pixels representing the lips, gums, and face area to darken (e.g., decrease the grayscale value). The video processing module 220 may employ palette change or an image change histogram equalization techniques to adjust the intensity values of pixels within the area of interest, increasing the overall contrast of the grayscale area of interest and generating the equalized area of interest.

In operation 630, the video processing module 220 thresholds the equalized area of interest to generate a binarized area of interest. The first set of pixels within the binarized area of interest have a first value. The second set of pixels within the binarized area of interest have a second value, distinct from the first value. For example, in some embodiments, the first value may be one and the second value may be zero. In some embodiments, the video processing module 220 thresholds the equalized area of interest using Otsu thresholding (e.g., Otsu's method). In these embodiments, the video processing module 220 performs clustering-based image thresholding to the equalized area of interest. The Otsu thresholding processes cause the video processing module 220 to generate the binarized area of interest, separating a first set of pixels from a second set of pixels. For example, after the thresholding, the area of interest has a first set of pixels having a first value (e.g., a value of one indicating a white pixel) and a second set of pixels having a second value (e.g., a value of zero indicating a black pixel). In performing Otsu thresholding, the video processing module 220 may calculate a threshold separating the first set of pixels and the second set of pixels. The video processing module 220 then applies the threshold to the intensity values (e.g., grayscale values) for the pixels to differentiate between the first set of pixels and the second set of pixels. Where a pixel has an intensity value greater than the threshold, the video processing module 220 converts the value of the pixel to a one, producing a white pixel. Where a pixel has an intensity value below the threshold, the video processing module 220 converts the value of the pixel to a zero, producing a black pixel. The resulting first set of pixels and the second set of pixels form the binary area of interest.

In some embodiments, the operations 610, 620, and 630 may be substituted by a collected binarization operation. The binarization operation calculates a binarization matrix (e.g., a binary value for each pixel within the area of interest or the image) from pixel values within the area of interest. For example, where color values for pixels are composed of red, green, and blue values, the binarization operation calculates the binarization matrix from RGB values for the area of interest or the image. In some instances, the binarization matrix is generated by marking a binary value of a pixel as a value of one or a value of zero. The binarization operation may determine that binarization[i][j]=1 if red[i][j]>green[i][j]+blue[i][j]/2, otherwise the binarization[i][j]=zero. In some instances, the video processing module 220 generates the binarization matrix based on the red value being greater than the sum of green and blue values divided by a constant. Although specific examples for equations for generating the binary pixel values for the binarization matrix have been described, it should be understood that different equations or criteria may be used to generate the binarization matrix.

Figure 7:
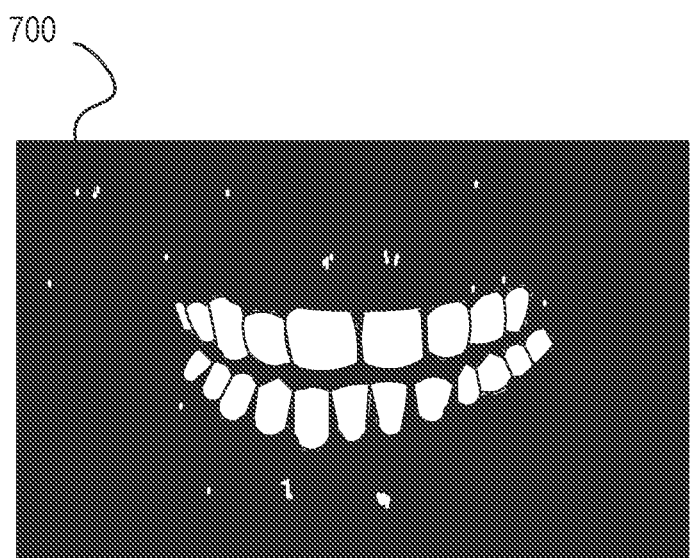
FIG. 7 illustrates a binarized image of an area of interest with noise pixels, according to some example embodiments.

In operation 640, the video processing module 220 identifies one or more pixels having the first value and positioned between two or more of a plurality of segments having the second value. In some instances, the second set of pixels comprises the plurality of segments interrupted by one or more pixels 700 having the first value, as shown in FIG. 7. In some instances the interruption from the one or more pixels with the first value represents noise, a lighting defect, or other unintended intersection between the first set of pixels and the second set of pixels. The video processing module 220 may identify the one or more noise pixels based on a position of the noise pixels with respect to other pixels having the same value and a number of pixels having the same value as the noise pixels.

For example, where the video processing module 220 identifies a potential set of noise pixels having the first value within a set of pixels having the second value, the video processing module 220 may determine the number of noise pixels. Where the number of noise pixels is below a predetermined threshold (e.g., a value, a percentage of the area of interest, a percentage of the original image), the video processing module 220 may determine whether the noise pixels are proximate (e.g., neighbor or connect) to a larger group of the first set of pixels.

In operation 650, the video processing module 220 replaces the first value of the identified one or more pixels with the second value. Where the video processing module 220 determines the noise pixels are unconnected to a larger group of the first set of pixels, and below the predetermined threshold, the video processing module 220 converts the value for the noise pixels to the second value, matching the second set of pixels.

In some embodiments, in performing the operation 650, the video processing module 220 identifies groups of pixels within the first set of pixels having a number or proportion smaller than a predetermined error threshold. For example, where the pixels in the first set of pixels, which remain after the conversion of noise pixels, represent exposed teeth in a mouth, the video processing module 220 may identify subsets of the first set of pixels. Subsets of the first set of pixels may be a set of pixels having the first value which are separated from another subset by a portion of the second set of pixels. For example, where the binarized area of interest includes an exposed teeth in a mouth as the object of interest, a subset of pixels is a set of pixels (e.g., white pixels) representing a tooth which is separated from other teeth by a line or gap (e.g., black pixels) of the second set of pixels. Where a subset of the first set of pixels is below the error threshold, the subset is converted to the second value otherwise removed from consideration by the image segmentation system 160. In some embodiments, the error threshold is a percentage of the area of the original image. In some instances the error threshold is between zero and two percent of the area of the original image. For example, where the subset of the first set of pixels has an area below one percent of the total area of the image, the video processing module 220 may convert the subset to the second value or otherwise remove the subset from consideration.

Figure 8:
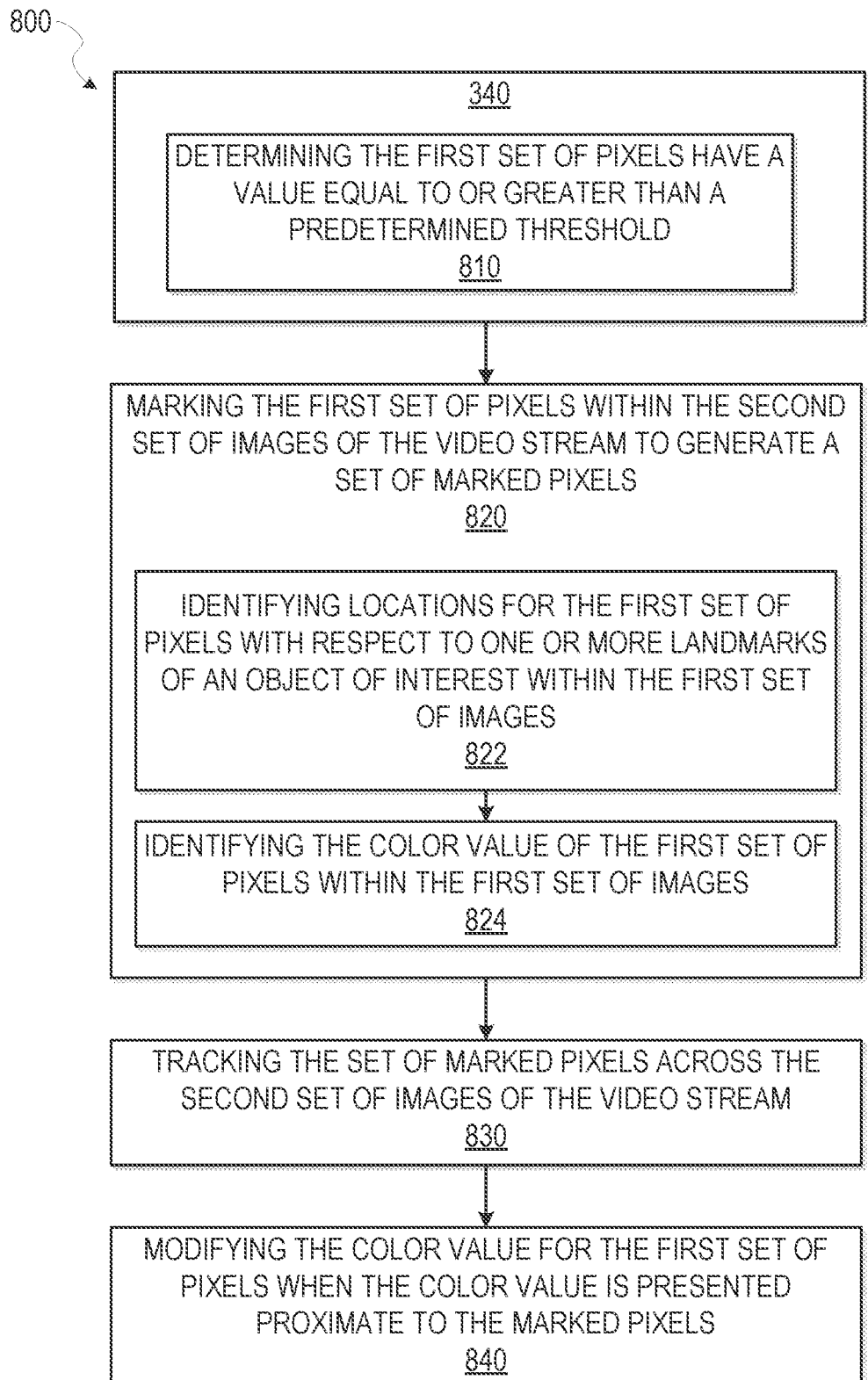
FIG. 8 is a flow diagram illustrating an example method for tracking and modifying an object of interest in a video stream, according to some example embodiments.

FIG. 8 depicts a flow diagram illustrating an example method 800 of tracking and modifying the object of interest in a video stream using the image segmentation system 160. The operations of method 800 may be performed by components of the image segmentation system 160. In some instances, certain operations of the method 800 may be performed using one or more operations of the methods 300 or 600, in one or more of the described embodiments, or as sub-operations of one or more operations of the methods 300 or 600, as will be explained in more detail below.

In various example embodiments, the method 800 is initially performed by operations 310, 320, and 330. In some instances the operation 330 includes one or more of the operations of method 600.

In operation 810, the identification module 230 determines the first set of pixels have a value equal to or greater than a predetermined threshold (e.g., an interest threshold). In some example embodiments, the operation 810 may be performed as a sub-operation of the operation 340. The identification module 230 may determine the first set of pixels in the binarized area of interest, produced in either the operation 330 or 630, have a value greater than the interest threshold. In some embodiments, the interest threshold of 0.5 or 1.

Figure 9:
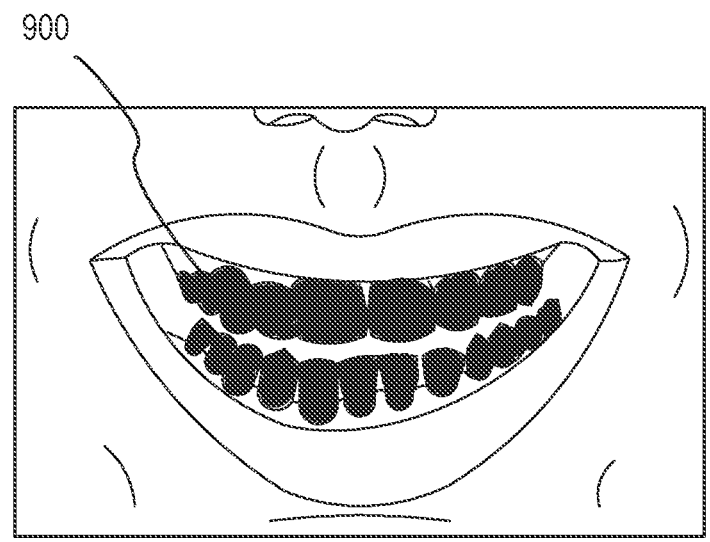
FIG. 9 illustrates a set of marked pixels within an area of interest, according to some example embodiments.

In operation 820, the identification module 230 marks the first set of pixels within the second set of images of the video stream to generate a set of marked pixels 900, as shown in FIG. 9. The set of marked pixels are pixels which will be tracked within the second set of images in the video stream. The marked pixels may be identified and included in a set of interest points to establish a relationship of the marked pixels to one or more orientation point. In some instances, marking the first set of pixels comprises one or more sub-operations.

In operation 822, the identification module 230 identifies locations for the first set of pixels with respect to one or more landmarks of an object of interest within the first set of images. In embodiments where the first set of pixels represent exposed teeth within a mouth depicted within the area of interest (e.g., the binary area of interest), the identification module 230 identifies the locations of the first set of pixels with respect to facial recognition landmarks on the face representing the mouth or proximate thereto. For example, the first set of pixels may be added as a set of landmark points on a binary mask of the face comprising a set of facial landmarks.

In operation 824, the identification module 230 identifies the color value of the first set of pixels within the first set of images. In embodiments where the first set of images have been marked for tracking (e.g., identified as the set of landmark points within a set of reference landmarks for an object depicted in the first set of images), in the second set of images of the video stream one or more of the identification module 230 and the tracking module 250 identifies corresponding pixels within one or more images of the second set of images which correspond to the first set of pixels. In some embodiments, the identification module 230 and the tracking module 250 establish the correspondence using one or more image tracking operations, such as a suitable set of operations for facial tracking. After establishing the corresponding pixels, the identification module 230 identifies one or more color values associated with the corresponding pixels. For example, the identification module 230 may identify a set of values for a red channel, green channel, and a blue channel (e.g., red/green/blue (RGB) values) for the corresponding pixels.

In operation 830, the tracking module 250 tracks the set of marked pixels across the second set of images of the video stream. In some embodiments, in order to track the marked pixels, the tracking module 250 tracks the landmark points representing the marked pixels or the corresponding pixels in the second set of images. The tracking module 250 may use any suitable tracking operations to identify changes in depiction (e.g., whether the landmarks are obstructed), position, and orientation of the marked pixels across images within the second set of images of the video stream. In embodiments where the marked pixels represent exposed teeth, the tracking module 250 detects changes in position and orientation of the teeth across the second set of images of the video stream. The tracking module 250 may also detect and track obstruction of the teeth (e.g., the marked pixels), where lips, hands, hair, tongue, or other obstructions obfuscate the teeth and prevent exposure of the teeth within one or more images of the second set of images.

In operation 840, the modification module 240 modifies the color value for the first set of pixels when the color value is presented proximate to the marked pixels. In various embodiments, the modification module 240 receives an indication of the corresponding pixels (e.g., pixels within the image proximate to or at a position of the marked pixels or landmarks) from the tracking module 250. As described above, with respect to the operation 350, the modification module 240 may modify the color value for the marked pixels within images of the second set of images or modify the color by applying an image layer to images within the second set of images.

Where the tracking module 250 determines the marked pixels are obstructed, the modification module 240 does not modify colors of the pixels within images of the second set of images or apply the image layer. For example, where the marked pixels represent exposed teeth within a mouth, the tracking module 250 passes a color change instruction to the modification module 240 triggering the modification module 240 to modify the color value of the corresponding pixels. Where the tracking module 250 detects an obstruction of the marked pixels within an image, the tracking module 250 does not send a color change instruction for the image or sends an instruction for the modification module 240 to wait or cease modifying images until the tracking module 250 detects the marked pixels in a subsequent image (e.g., detecting the obstruction is no longer present.)

Modules, Components, and Logic

Certain embodiments are described herein as including logic or a number of components, modules, or mechanisms. Modules can constitute hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 10:
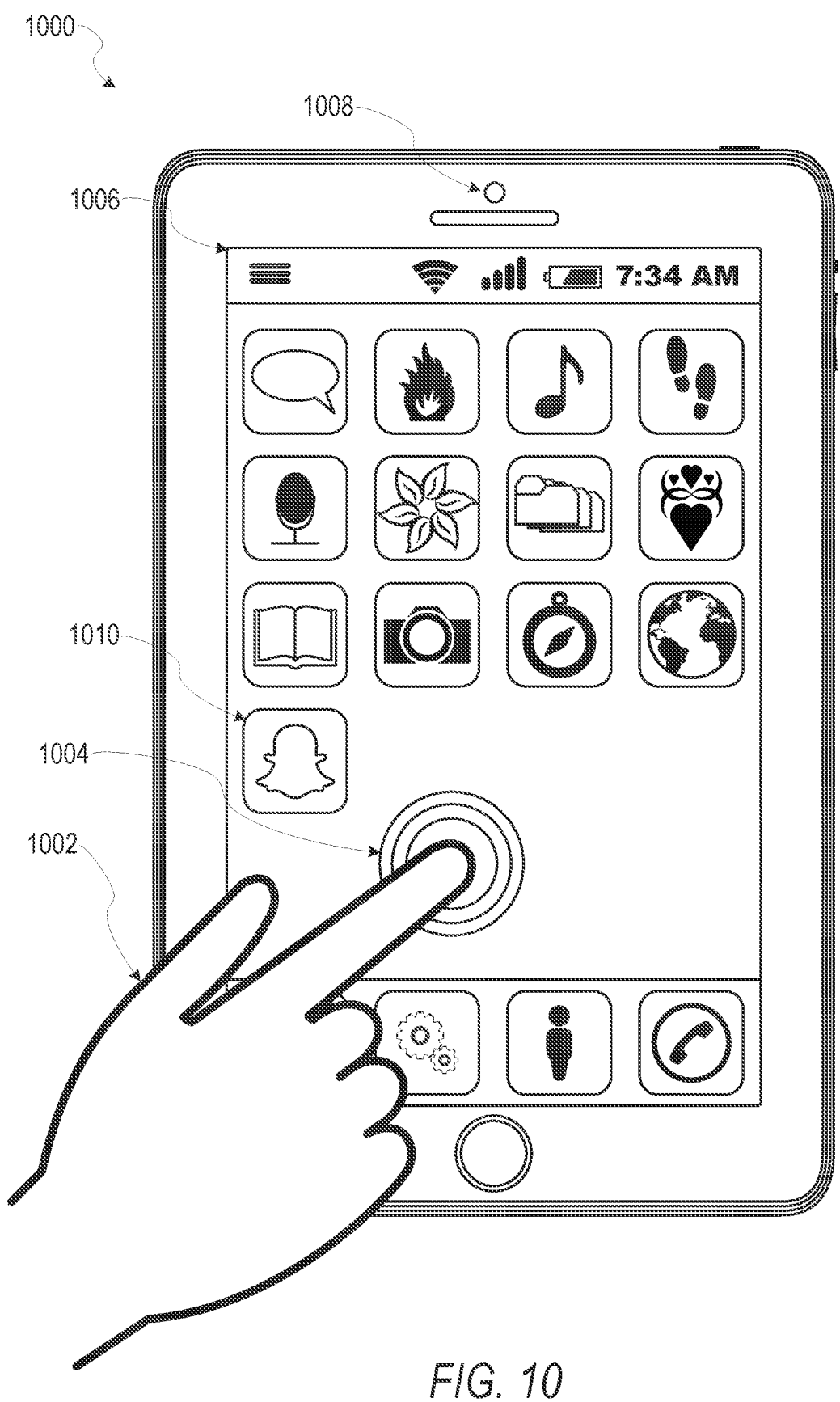
FIG. 10 is a user interface diagram depicting an example mobile device and mobile operating system interface, according to some example embodiments.

FIG. 10 illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user 1002. For instance, the user 1002 may physically touch 1004 the mobile device 1000, and in response to the touch 1004, the mobile device 1000 may determine tactile data such as touch location, touch force, or gesture motion. In various example embodiments, the mobile device 1000 displays a home screen 1006 (e.g., Springboard on IOS™) operable to launch applications or otherwise manage various aspects of the mobile device 1000. In some example embodiments, the home screen 1006 provides status information such as battery life, connectivity, or other hardware statuses. The user 1002 can activate user interface elements by touching an area occupied by a respective user interface element. In this manner, the user 1002 interacts with the applications of the mobile device 1000. For example, touching the area occupied by a particular icon included in the home screen 1006 causes launching of an application corresponding to the particular icon.

The mobile device 1000, as shown in FIG. 10, includes an imaging device 1008. The imaging device may be a camera or any other device coupled to the mobile device 1000 capable of capturing a video stream or one or more successive images. The imaging device 1008 may be triggered by the image segmentation system 160 or a selectable user interface element to initiate capture of a video stream or succession of images and pass the video stream or succession of images to the image segmentation system for processing according to the one or more methods described in the present disclosure.

Many varieties of applications (also referred to as "apps") can be executing on the mobile device 1000, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app 1010 such as SNAPCHAT® that, consistent with some embodiments, allows users to exchange ephemeral messages that include media content. In this example, the social messaging app 1010 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the image segmentation system 160 may identify, track, and modify an object of interest within the ephemeral video clip, as the ephemeral video clip is being captured by the device and transmit the ephemeral video clip to another device using the ephemeral message system.

Software Architecture

Figure 11:
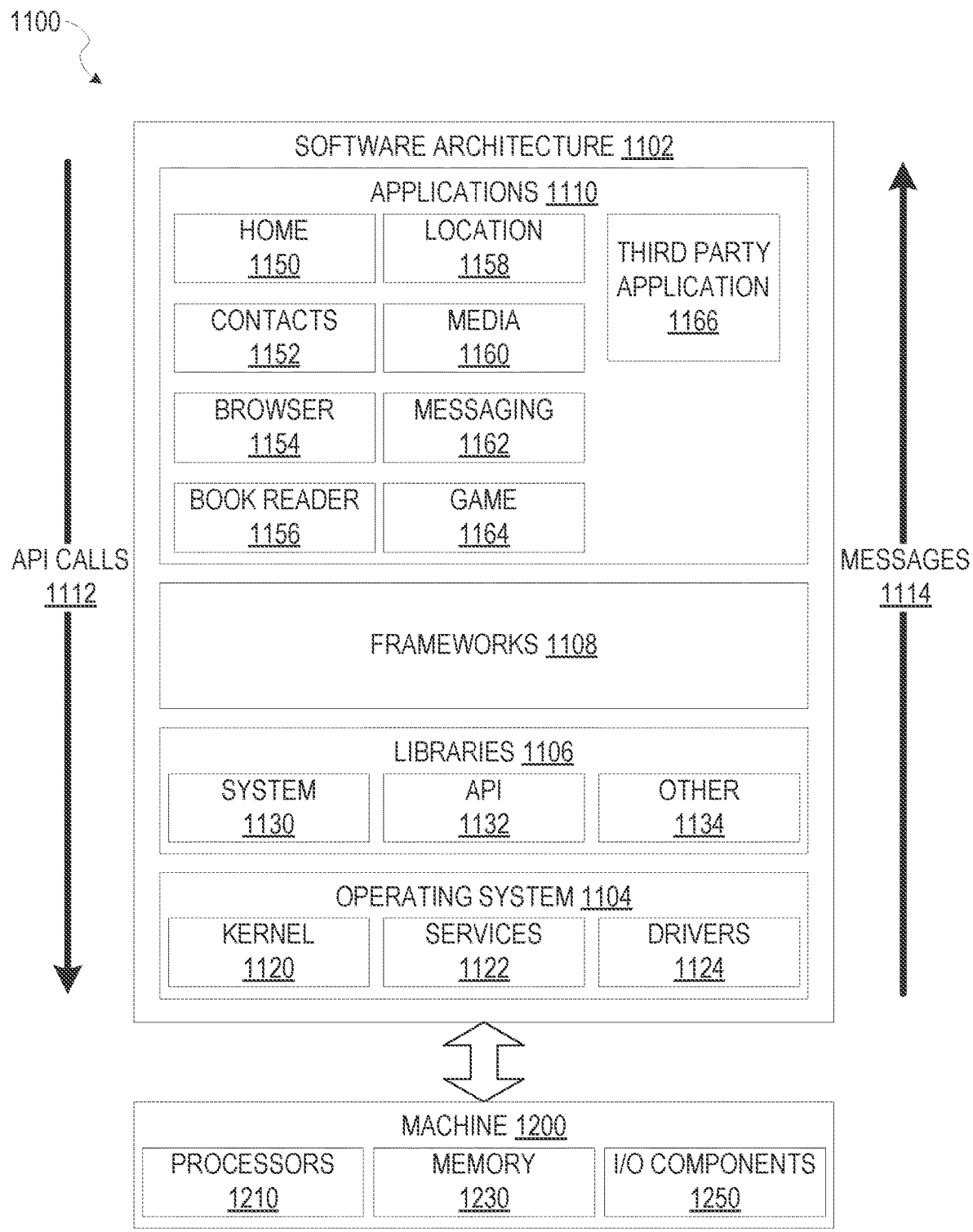
FIG. 11 is a block diagram illustrating an example of a software architecture that may be installed on a machine, according to some example embodiments.

FIG. 11 is a block diagram 1100 illustrating an architecture of software 1102, which can be installed on the devices described above. FIG. 11 is merely a non-limiting example of a software architecture, and it will be appreciated that many other architectures can be implemented to facilitate the functionality described herein. In various embodiments, the software 1102 is implemented by hardware such as machine a 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party application 1166. According to some embodiments, the applications 1110 are programs that execute functions defined in the programs. Various programming languages can be employed to create the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1166 can invoke the API calls 1112 provided by the operating system 1104 to facilitate functionality described herein.

Example Machine Architecture and Machine-Readable Medium

Figure 12:
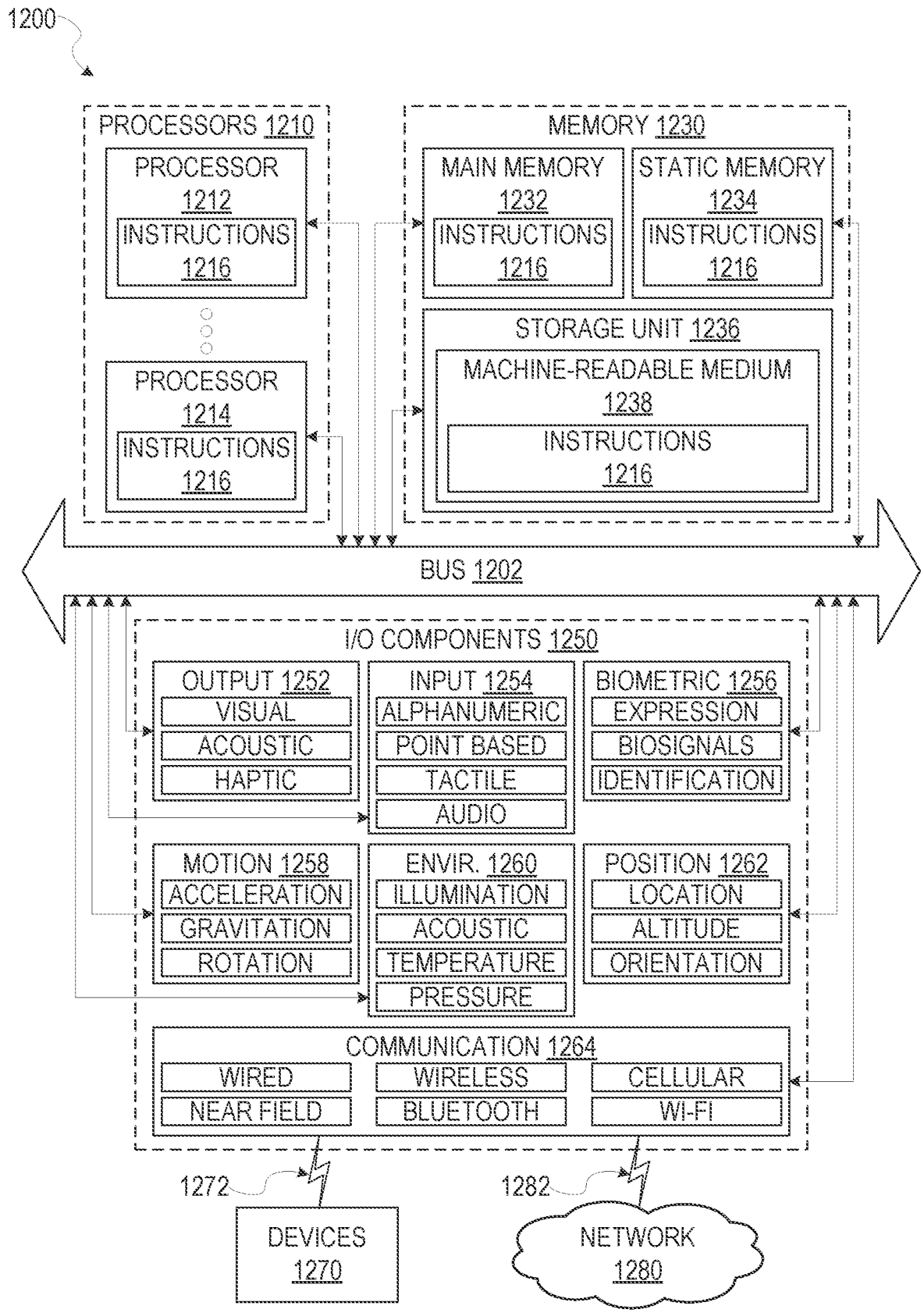
FIG. 12 is a block diagram presenting a diagrammatic representation of a machine in the form of a computer system within which a set of instructions may be executed for causing the machine to perform any of the methodologies discussed herein, according to an example embodiment.

FIG. 12 is a block diagram illustrating components of a machine 1200, according to some embodiments, able to read instructions (e.g., processor executable instructions) from a machine-readable medium (e.g., a non-transitory machine-readable storage medium) and perform any of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1212 and a processor 1214 that may execute the instructions 1216. The term "processor" is intended to include multi-core processors that may comprise two or more independent processors (also referred to as "cores") that can execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by processors of the machine 1200 (e.g., processors 1210), cause the machine 1200 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium should be considered as being transportable from one physical location to another. Additionally, since the machine-readable medium 1238 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

determining, using one or more processors of a client device, an approximate location of an object of interest within a video stream comprising a first set of images and a second set of images;

identifying, by the one or more processors, an area of interest comprising a plurality of pixels within the one or more images of the first set of images, the area of interest being a portion of the one or more images encompassing the approximate location of the object of interest;

generating, by the client device a binarization matrix by performing operations comprising:

for each pixel of the plurality of pixels within the area of interest:

retrieving a set of color values associated with the pixel;

determining a binary value for the pixel by comparing a first value of a first portion of the set of color values with a second value of a second portion of the set of color values;

storing the binary value for the pixel in the binarization matrix;

modifying each pixel in the plurality of pixels within the area of interest using the binarization matrix to create a binarized area of interest;

identifying, by the one or more processors, a first set of pixels and a second set of pixels within the binarized area of interest; and modifying, by the one or more processors, a color value for the first set of pixels within the second set of images of the video stream.

2. The method of claim 1, further comprising:

converting the plurality of pixels within the area of interest to values along a grayscale to generate a grayscale area of interest, the plurality of pixels converted to grayscale by, for each pixel, generating a grayscale value by multiplying a fixed intensity value with a quotient of a triplet of color saturation values of the pixel.

3. The method of claim 2, wherein the pixels within the grayscale area of interest comprise a histogram of values within the grayscale and further comprising:

equalizing the histogram values within the grayscale area of interest to generate an equalized area of interest.

4. The method of claim 3, further comprising:

thresholding the equalized area of interest to generate the binarized area of interest, the first set of pixels within the binarized area of interest having a first value and the second set of pixels within the binarized area of interest having a second value distinct from the first value.

5. The method of claim 4, wherein the second set of pixels comprises a plurality of segments interrupted by one or more pixels having the first value and generating the binarized area of interest further comprising:

identifying one or more pixels having the first value positioned between two or more of the plurality of segments having the second value; and replacing the first value of the identified one or more pixels with the second value.

6. The method of claim 4, further comprising:

determining the first set of pixels have a value greater than a predetermined threshold; and marking the first set of pixels within the second set of images of the video stream to generate a set of marked pixels.

7. The method of claim 5, wherein marking the first set of pixels within the second set of images further comprises:

identifying locations for the first set of pixels with respect to one or more landmarks of the object of interest depicted within the first set of images; and identifying the color value of the first set of pixels within the first set of images.

8. The method of claim 5, wherein modifying the color value for the first set of pixels within the second set of images further comprises:

tracking the set of marked pixels across the second set of images of the video stream; and modifying the color value for the first set of pixels when the color value is presented proximate to the marked pixels.

9. A system comprising:

one or more processor; and a non-transitory machine-readable storage medium storing processor executable instructions that, when executed by a processor of a machine, cause the machine to perform operations comprising:

determining, using one or more processors of a client device, an approximate location of an object of interest within a video stream comprising a first set of images and a second set of images;

identifying, by the one or more processors, an area of interest comprising a plurality of pixels within the one or more images of the first set of images, the area of interest being a portion of the one or more images encompassing the approximate location of the object of interest;

generating, by the client device a binarization matrix by performing operations comprising:

for each pixel of the plurality of pixels within the area of interest:

retrieving a set of color values associated with the pixel;

determining a binary value for the pixel by comparing a first value of a first portion of the set of color values with a second value of a second portion of the set of color values;

storing the binary value for the pixel in the binarization matrix;

modifying each pixel in the plurality of pixels within the area of interest using the binarization matrix to create a binarized area of interest;

identifying, by the one or more processors, a first set of pixels and a second set of pixels within the binarized area of interest; and modifying, by the one or more processors, a color value for the first set of pixels within the second set of images of the video stream.

10. The system of claim 9, further comprising:

converting the plurality of pixels within the area of interest to values along a grayscale to generate a grayscale area of interest, the plurality of pixels converted to grayscale by, for each pixel, generating a grayscale value by multiplying a fixed intensity value with a quotient of a triplet of color saturation values of the pixel.

11. The system of claim 10, wherein the pixels within the grayscale area of interest comprise a histogram of values within the grayscale and further comprising:

equalizing the histogram values within the grayscale area of interest to generate an equalized area of interest.

12. The system of claim 11, further comprising:
thresholding the equalized area of interest to generate the binarized area of interest, the first set of pixels within the binarized area of interest having a first value and the second set of pixels within the binarized area of interest having a second value distinct from the first value.

13. The system of claim 12, wherein the second set of pixels comprises a plurality of segments interrupted by one or more pixels having the first value and generating the binarized area of interest further comprising:
identifying one or more pixels having the first value positioned between two or more of the plurality of segments having the second value; and
replacing the first value of the identified one or more pixels with the second value.

14. The system of claim 12, further comprising:
determining the first set of pixels have a value greater than a predetermined threshold; and
marking the first set of pixels within the second set of images of the video stream to generate a set of marked pixels.

15. The system of claim 14, wherein marking the first set of pixels within the second set of images further comprises:
identifying locations for the first set of pixels with respect to one or more landmarks of the object of interest depicted within the first set of images; and
identifying the color value of the first set of pixels within the first set of images.

16. The system of claim 14, wherein modifying the color value for the first set of pixels within the second set of images further comprises:
tracking the set of marked pixels across the second set of images of the video stream; and
modifying the color value for the first set of pixels when the color value is presented proximate to the marked pixels.

17. A non-transitory machine-readable storage medium storing processor executable instructions that, when executed by a processor of a machine, cause the machine to perform operations comprising:
determining, using one or more processors of a client device, an approximate location of an object of interest within a video stream comprising a first set of images and a second set of images;
identifying, by the one or more processors, an area of interest comprising a plurality of pixels within the one or more images of the first set of images, the area of interest being a portion of the one or more images encompassing the approximate location of the object of interest;
generating, by the client device a binarization matrix by performing operations comprising:
for each pixel of the plurality of pixels within the area of interest:
retrieving a set of color values associated with the pixel;
determining a binary value for the pixel by comparing a first value of a first portion of the set of color values with a second value of a second portion of the set of color values;
storing the binary value for the pixel in the binarization matrix;
modifying each pixel in the plurality of pixels within the area of interest using the binarization matrix to create a binarized area of interest;
identifying, by the one or more processors, a first set of pixels and a second set of pixels within the binarized area of interest; and
modifying, by the one or more processors, a color value for the first set of pixels within the second set of images of the video stream.

18. The non-transitory machine-readable storage medium of claim 17, further comprising:
converting the plurality of pixels within the area of interest to values along a grayscale to generate a grayscale area of interest, the plurality of pixels converted to grayscale by, for each pixel, generating a grayscale value by multiplying a fixed intensity value with a quotient of a triplet of color saturation values of the pixel.

19. The non-transitory machine-readable storage medium of claim 18, wherein the pixels within the grayscale area of interest comprise a histogram of values within the grayscale and further comprising:
equalizing the histogram values within the grayscale area of interest to generate an equalized area of interest.

20. The non-transitory machine readable storage medium of claim 19, further comprising:
thresholding the equalized area of interest to generate the binarized area of interest, the first set of pixels within the binarized area of interest having a first value and the second set of pixels within the binarized area of interest having a second value distinct from the first value.

* * * * *